(12) United States Patent
Pruski

(10) Patent No.: US 12,220,728 B2
(45) Date of Patent: Feb. 11, 2025

(54) SORTING DEVICE FOR SORTING PIECE GOODS IN END LOCATIONS

(71) Applicant: Deutsche Post AG, Bonn (DE)

(72) Inventor: Matthäus Pruski, Troisdorf (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 18/314,620

(22) Filed: May 9, 2023

(65) Prior Publication Data

US 2023/0364649 A1 Nov. 16, 2023

(30) Foreign Application Priority Data

May 10, 2022 (DE) .......................... 102022111696.4

(51) Int. Cl.
*B07C 3/08* (2006.01)
*B07C 1/18* (2006.01)
*B07C 3/00* (2006.01)

(52) U.S. Cl.
CPC .................. *B07C 3/08* (2013.01); *B07C 1/18* (2013.01); *B07C 3/008* (2013.01)

(58) Field of Classification Search
CPC .. B07C 1/18; B07C 3/08; B07C 3/008; B65G 1/12; B65G 1/045; B65G 47/5113
See application file for complete search history.

(56) References Cited

U.S. PATENT DOCUMENTS

| | | | |
|---|---|---|---|
| 4,963,251 A * | 10/1990 | Bohm | B07C 1/04 209/584 |
| 5,441,141 A | 8/1995 | Bonnet | |
| 6,004,091 A | 12/1999 | Roth | |
| 6,253,910 B1 * | 7/2001 | Axmann | B65G 17/345 209/509 |
| 2003/0038065 A1 * | 2/2003 | Pippin | B07C 3/087 198/370.01 |
| 2007/0084764 A1 * | 4/2007 | Benninger | B07C 3/008 209/584 |

FOREIGN PATENT DOCUMENTS

| | | |
|---|---|---|
| DE | 3731589 A1 | 3/1989 |
| DE | 20019292 U1 | 3/2001 |
| EP | 1042082 | 10/2000 |
| EP | 3593913 A | 1/2020 |

OTHER PUBLICATIONS

Office Action for Application No. DE 10 2022 111 696.4, dated Jan. 24, 2023, 23 pages.
European Search Report (w/ English translation) for corresponding Application No. EP23172253, dated Oct. 4, 2023, 14 pages.

* cited by examiner

*Primary Examiner* — Michael McCullough
*Assistant Examiner* — Kalyanavenkateshware Kumar
(74) *Attorney, Agent, or Firm* — Dority & Manning, P.A.

(57) ABSTRACT

A sorting device for sorting piece goods in end locations includes a plurality of horizontal conveyors, which are arranged one above another and are configured as conveyor belts, for conveying the piece goods in a circuit, wherein the conveyors are configured to move the piece goods perpendicularly to the conveying direction of the circuit. The sorting device also includes a plurality of end locations, wherein the end locations are arranged along the conveyors in such a manner that the piece goods can be transported into the end locations by the movement perpendicularly to the conveying direction. The piece goods are transported from the conveyor into the end location only by the conveyor.

13 Claims, 2 Drawing Sheets

SORTING DEVICE FOR SORTING PIECE GOODS IN END LOCATIONS

CROSS-REFERENCE TO RELATED APPLICATIONS

The present application is based on and claims the right of priority to German Patent Application No. DE 10 2022 111 696.4, filed May 10, 2022, the disclosure of which is hereby incorporated by reference herein in its entirety for all purposes.

TECHNICAL FIELD

The invention relates to a sorting device for sorting piece goods in end locations.

In addition, the invention relates to the use of the above device for sorting the piece goods into the end locations.

BACKGROUND OF THE INVENTION

As a result of B commerce and online mail-order businesses, the number of transported goods, and in particular the number of small to medium-sized envelopes and packages, has increased significantly.

Sorting of these very small articles frequently takes place manually at corresponding end locations, for example according to a delivery address or postcode, but this is intensive in terms of personnel and expensive. In addition, the sorting speed cannot be increased as desired, and the sorting process is prone to error.

Furthermore, it is known to use robot arms for sorting the piece goods. BP 3 593 913 A1 describes a sorting system for parcels, in which a sorting mechanism is configured as a robot arm, and is designed to sort a multiplicity of parcels according to sorting information relating to the parcels.

An advantage of manual sorting and also of a robot arm is that little space is taken up for the sorting, and the sorting process can be carried out at different locations because of easy transportability of the robot arm and/or of the sorting employees. However, the limited speed of movement of the robot arm, which also has a negative effect on the efficiency of the sorting process, is disadvantageous. Typical sorting capacities of robot arms lie in the range of 750 piece goods per hour, which is equivalent to a processing time of 4.8 seconds per item.

DESCRIPTION OF THE INVENTION

Starting from this situation, it is an object of the present invention to provide a sorting device which achieves a high sorting capacity while requiring little space.

The object of the invention is achieved by the features of the independent claims. Advantageous refinements are specified in the dependent claims.

Accordingly, the object is achieved by a sorting device for sorting piece goods in end locations, comprising
 a plurality of horizontal conveyors, which are arranged one above another and are configured as conveyor belts, for conveying the piece goods in a circuit, wherein the conveyors are configured to move the piece goods perpendicularly to the conveying direction of the circuit, and
 a plurality of end locations, wherein the end locations are arranged along the conveyors in such a manner that the piece goods can be transported into the end locations by the movement perpendicularly to the conveying direction,
 wherein the piece goods are transported from the conveyor into the end location only by the conveyor.

One aspect of the invention consists in that a plurality of horizontal conveyors are used for the sorting, wherein the conveyors are configured to convey the piece goods in a circuit and to move the piece goods perpendicularly to the conveying direction of the circuit. Since the end locations are arranged along the conveyors, the piece goods can be conveyed from the conveyors directly into the respective end locations. The piece goods are transported from the conveyor into the respective end location solely by the conveyor—i.e. preferably without a further apparatus independent of the conveyor, such as a handling apparatus, being used.

In particular, provision is made that the plurality of conveyors are arranged one above another. Provision is preferably also made that the end locations are arranged one above another. That is to say, in other words, a plurality of levels of conveyors are preferably provided with corresponding end locations for sorting the piece goods into the end locations. The conveyors arranged one above another result in the sorting device taking up very little space, in particular in respect of the footprint. In addition, the conveyors are very much more rapid than a robot arm, and therefore efficient sorting of the piece goods into the respective end locations is possible by means of the conveyors. In other words, the conveyors can therefore provide a continuous flow of piece goods for sorting, and therefore much higher sorting capacities can be achieved than by manual sorting or by sorting by means of a robot arm.

The end locations are preferably arranged uniformly along the conveyor, which is configured as a circuit. This has the advantage that, at a given time, basically not only one item can be conveyed from the conveyor into the corresponding end location, but, with a favorable position of the piece goods, a plurality of piece goods can be conveyed simultaneously into their corresponding end locations since the piece goods are distributed uniformly on the conveyor. A high degree of sorting efficiency is therefore achieved.

The piece goods are preferably configured as very small articles, small to medium-sized envelopes, flyers and/or small packages. The piece goods preferably have lateral dimensions of not more than 480 mm and/or a weight of ≤10 kg. Particularly preferably, a length of the piece goods is ≤480 mm, a width of the piece goods ≤380 mm and/or a height of the piece goods ≤150 mm. Furthermore preferably, a length of the piece goods is ≥140 ram, a width of the piece goods ≥125 mm and/or a height of the piece goods ≥0.5 mm. In addition, the weight of the piece goods is preferably ≥0.1 kg.

The conveyor is a horizontal conveyor, which means in the present case that a normal vector of a conveying surface of the conveyor faces upwards in space over the entire circuit of the conveyor, and does not face half downwards in space as in the case of a vertical conveyor. In addition, the conveyor is configured to move the piece goods perpendicularly to the transport direction of the circuit. In this regard, provision is preferably made that the conveyor comprises discharging units which are configured to move the piece goods perpendicularly to the transport direction of the circuit and to convey them into the end locations arranged along the conveyor. The conveyor is configured as a conveyor belt and particularly preferably as a cross belt sorter, tilt tray sorter or sliding shoe sorter. The conveyor preferably has a throughput of at least 750 piece goods per hour.

In conjunction with the shape of the circuit, provision is made, according to a preferred development of the invention, that the circuit is configured substantially as a regular polygon or as a circle. Configured substantially as a regular polygon means here that the corners of the polygon are rounded, which is advantageous for conveying the piece goods. The circuit can therefore be provided, for example, in square, regular hexagonal, or regular octagonal form. The circuit is particularly preferably circular. Regular polygons and in particular the circular form are very space-saving, and therefore the sorting device can be erected even in confined space conditions, for example at an airport. In addition, the circular form has the advantage that the curvature over the entire circuit is consistent, and therefore stable transport, without sudden changes in direction, of the piece goods along the circuit is easily possible. In addition, the circular form provides the shortest distance, and therefore a high sorting speed is made possible. Similarly, by changing the diameter of the circularly configured circuit, the number of end locations can be changed in a simple manner and adapted to the circumstances.

In the case of a circular form, in which the conveyor is also referred to as a circular conveyor, provision is therefore preferably made that the conveyor is configured to convey the piece goods in a circular form, i.e. in a tangential direction, and is also configured to move the piece goods in the radial direction for the purpose of discharging them.

According to a further preferred development, provision is preferably made with regard to the conveyors that the conveyors are arranged congruently one above another. In other words, the circuit of a conveyor runs in one plane, i.e. preferably precisely above the circuit of a conveyor in a plane lying therebelow and/or precisely below the circuit of a conveyor in a plane lying thereabove. The end locations which are arranged along the conveyors are thus preferably also arranged one above another. The entire sorting device therefore preferably has a compact, space-saving design. In principle, the conveying direction of the conveyors arranged one above another may be different from one another, i.e., for example, that a first conveyor conveys the piece goods in the clockwise direction along the circuit and a conveyor arranged thereabove conveys the same anticlockwise. Preferably, however, provision is made that the conveyors arranged one above another have the same conveying direction. This simplifies the design of the sorting device.

The sorting device preferably takes up a footprint of no more than 50 m$^2$. In the case of a circular conveyor, with such a footprint, typically 22 end locations per conveyor can be arranged along the conveyor. If, for example, four conveyors are arranged one above another, a sorting device for sorting piece goods into up to 88 end locations can therefore be provided in this way.

According to a further preferred development of the invention, the sorting device comprises a supply transport means for producing a supply flow of piece goods to at least one conveyor. The supply transport means is therefore preferably configured to supply the piece goods to the conveyors. The supply transport means is, for example, a conveyor line. Since, during the sorting by the sorting device, the piece goods are moved within the circuit of the conveyor into the respective end location, at the latest after passage through the circuit there is again space on the conveyor for receiving a further item from the supply transport means onto the conveyor. In principle, the supply transport means can be arranged in such a manner that the piece goods are supplied to the conveyors from an interior of the circuit—i.e. from the region surrounded by the circuit. Alternatively and preferably, provision is, however, made that the piece goods are supplied to the conveyor from outside the region surrounded by the circuit. The supply transport means is therefore preferably arranged next to the circuit and not within the circuit.

In conjunction with the supply transport means, provision can be made, in a preferred development of the invention, that the supply transport means is configured for producing an individual supply flow of piece goods for each conveyor. In other words, in this alternative, each conveyor therefore preferably has a dedicated supply flow of piece goods. For example, a main supply flow of piece goods can be divided into subordinate supply flows of piece goods, the subordinate supply flows of piece goods each supplying the piece goods to a conveyor arranged in a plane. Each conveyor therefore preferably has a dedicated supply flow of piece goods in this way. For example, the supply transport means can be split up depending on the number of conveyors arranged one above another. This has the advantage that it is basically, possible to dispense with connections in order to be able to transport piece goods between the conveyors arranged one above another.

In an alternative preferred development of the invention, provision is made that the supply transport means is configured for producing a supply flow of piece goods to precisely one and preferably to a lowermost or to an uppermost conveyor. This has the advantage that the supply flow of piece goods does not have to be divided into subordinate supply flows of piece goods and/or that the supply transport means is not split up. The space required by the sorting device in this configuration is therefore very small. In addition, the development of the supply transport means, to the effect that a supply flow of piece goods to the lowermost conveyor is produced, has the advantage that the supply transport means does not have a slope. The design of the supply transport means and/or of the sorting device is therefore simplified.

According to a further preferred development of the invention, the supply transport means comprises a belt conveyor, spiral conveyor, ascending belt conveyor and/or elevating conveyor. The supply transport means is preferably configured as a belt conveyor and is designed to produce a supply flow of piece goods to the lowermost conveyor. Alternatively, provision is preferably made that the supply transport means comprises a spiral conveyor, an ascending belt conveyor and/or an elevating conveyor and is designed to produce a supply flow of piece goods to one of the higher conveyors arranged one above another. In other words, in order to overcome the slope which is present if a supply flow of piece goods is intended to be produced to a higher conveyor by means of the supply transport means, provision is therefore made that spiral conveyor, ascending belt conveyor or elevating conveyor is used.

In the case of an ascending belt conveyor, the item is conveyed on a rectilinear, inclined section to the desired height. By contrast, in the case of a spiral conveyor, the item is conveyed on a spiral path to the desired height. This has the advantage that the space required in respect of the footprint is smaller. In the case of an elevating conveyor, also called perpendicular conveyor or vertical conveyor, the item is moved perpendicularly upwards. This also saves space.

In particular if an individual supply flow of piece goods is not produced for each of the conveyors arranged one above another by means of the supply transport means, provision is made, according to a further preferred development of the invention, that the sorting device comprises an active or passive, transport means for producing a flow of piece goods between the plurality of conveyors arranged one above another. Furthermore preferably, provision is preferably made for speed and reliability reasons for the sorting device to comprise the active transport means.

According to a further preferred development of the invention, provision is made that the transport means is arranged in a region surrounded by the circuit of the conveyors. In contrast to the supply transport means which is preferably arranged next to the circuit, provision is therefore made that the transport means for producing the flow of piece goods between the plurality of conveyors arranged one above another is arranged within the circuit. This saves space which is thus also used by the space within the circuit.

With regard to the transport means for producing the flow of piece goods between the plurality of conveyors arranged one above another, provision can be made that each conveyor is connected to each conveyor by means of a transport means. In the case of four conveyors arranged one above another, six transport means would thus be necessary. Alternatively and preferably, provision is however made that the transport means are configured in such a manner that the flow of piece goods between the plurality of conveyors arranged one above another is not split up into a plurality of flows of piece goods. This has the advantage of not needing any collision control. Apart from a first conveyor, which is preferably connected to the supply transport means and to a transport means, and a final conveyor, which is merely connected to a transport means, all of the conveyors are preferably connected to two transport means. A first of the two transport means in each case supplies the piece goods to the conveyor and the second in each case removes the piece goods from the conveyor. This therefore simplifies the operation of the sorting device since the flow of piece goods within the planes of the conveyors arranged one above another is not split up and brought together again, but rather the piece goods pass through the conveyors in a defined sequence before they are discharged at their corresponding end location into the end location, as a result of which collision control between the piece goods is superfluous. This is because an item which is located on a conveyor in one plane has been discharged into the corresponding end location at the latest after passing through the circuit of the conveyor or has been moved by the transport means onto another of the conveyors arranged one above another. There is thus always space on the conveyor for receiving an item from the supply transport means.

Provision is also preferably made in this connection that a flow of piece goods is in each case produced precisely between two adjacent conveyors of the conveyors arranged one above another. In other words, transport means for producing a flow of piece goods between two nonadjacent conveyors is preferably therefore dispensed with. The transport means thus does not need to overcome unnecessarily large distances, and this has a positive effect on the transport time and therefore on the sorting speed.

With regard to the passive transport means, provision is made, according to a further preferred development of the invention, that the passive transport means comprises a slide. In this connection, provision is also preferably made that the supply transport means produces a supply flow of piece goods to the highest conveyor. The piece goods are then transported between the conveyors preferably by means of gravity.

With regard to the active transport means, provision is made, according to a further preferred development of the invention, that the active transport means comprises a conveyor unit and preferably comprises a spiral conveyor, an ascending belt conveyor and/or an elevating conveyor. The active transport means preferably links a conveyor on a certain plane with a conveyor on a different plane. With regard to the ascending belt conveyor, provision can furthermore be preferably made that the ascending belt conveyor extends in the interior of the circuit transversely through the region surrounded by the circuit, that is to say, in other words, leads from one point on one conveyor to an opposite point on another of the conveyors arranged one above another. This has the advantage that an active transport means is very short and rapid conveying of the piece goods from one conveyor into another of the conveyors arranged one above another is thus permitted. With regard to the spiral conveyor, provision can furthermore preferably be made that the spiral conveyor extends along the inner side of the circuit. This has the advantage that the slope of the spiral conveyor can be selected to be very small, thus enabling reliable transport of the piece goods with the active transport means.

As already mentioned, the end locations are arranged along the conveyors. The end locations are preferably arranged along the conveyors in such a manner that the piece goods can be discharged into the end locations by movement of the piece goods perpendicularly to the conveying direction of the circuit. In other words, the end locations are therefore arranged directly at the conveyors.

In principle, the end locations can be arranged in the region surrounded by the circuit of the conveyor or, in other words, can be arranged along an inner edge of the circuit of the conveyor. Alternatively, however, provision is made, according to a preferred development, that the end locations are arranged along an outer edge of the circuit of the conveyors. Access to the end locations is thus greatly simplified since the end locations are accessible from the outside. The end locations can therefore always be emptied manually. In addition, the conveyors arranged one above another are shielded from the outside from the end locations, which is of advantage for the working safety.

According to a further preferred development of the invention, the end locations are arranged in the manner of hollow cylinders around the conveyors. The end locations therefore form as it were a multi-story tower, in the interior of which the conveyors arranged one above another are located and the circuit of which is preferably configured as a circular path. The end locations are furthermore preferably arranged in a uniform grid with lines and columns. In this way, a multiplicity of end locations can be accommodated with very little space being required. The end locations are preferably filled with the respective piece goods from the inside by means of the conveyors and are also easily accessible from the outside for the purpose of removing the piece goods. The regularity of the arrangement of the end locations also enables a plurality of piece goods to be conveyed simultaneously into their respective end location.

In connection with the end locations, provision is also made, according to a further preferred development of the invention, that the end locations comprise containers. It is of particular advantage to collect the piece goods in containers at the end locations. The plurality of end locations are preferably configured as shelves with containers preferably hung thereon. As a result, the piece goods collected in the containers can be removed from the shelf together with the respective container.

According to a further preferred development of the invention, provision is made that the sorting device and/or the end locations are configured for measuring filling levels at the end locations. For example, the end locations and/or the containers can be configured with a sensor which detects the filling level of the end location and/or of the container. The sensor can be configured, for example, as a light barrier. Alternatively, the filling level can be measured by counting the piece goods discharged into a respective end location.

Preferably, containers identified as full are exchangeable in an automated manner for empty containers. In this regard, provision is made, according to a further preferred development of the invention, that the sorting device and/or the end locations are configured for automatically exchanging and/or moving up containers at the end locations. Particularly preferably, the containers are displaceable radially in the shelves. For example, provision can be made that containers identified as full are automatically moved radially outwards in the shelf, as a result of which there is temporarily an end location without containers. In addition, empty containers can be arranged in the interior of the circuit and, when a container is identified as full, can be conveyed by means of the conveyors to the corresponding container-less end location in order to be fitted into the shelf there. Alternatively, a stack of containers can in each case be kept ready at the end locations such that a container identified as full is immediately replaceable by a container lying therebelow.

In addition, provision is made, according to a further preferred development of the invention, that the sorting device comprises a scanner, which is preferably arranged on the supply transport means, for detecting sorting information relating to the piece goods. In other words, a delivery address, a bar code or other sorting information relating to the piece goods are detected preferably means of the scanner, specifically preferably before the piece goods have reached the conveyors arranged one above another. Particularly preferably, the scanner is located on lie supply transport means, before a potential splitting up of the supply transport means.

According to a further preferred development of the invention, provision is made that the sorting device comprises a computing unit for controlling the flow of piece goods of the sorting device taking into consideration the sorting information relating to the respective piece goods in other words, provision is therefore preferably made that the scanner scans the piece goods and the sorting information relating to the piece goods, for example a delivery address or a bar code, is thus detected. The computing unit allocates the sorting destination—i.e. the corresponding end location—on the basis of the sorting information relating to the piece goods, and then controls the sorting device preferably in such a manner that the item is sorted into the end location corresponding thereto. In other words, on the basis of the sorting information relating to the piece goods, the sorting device therefore identifies to which end location the item has to be transported, and therefore also identifies to which plane of the conveyors arranged one above another the item has to be transported.

In this connection, provision is furthermore preferably made that the end locations are arranged in such a manner that end locations closest to the supply transport means correspond to the statistically most frequent sorting destinations. If, therefore, for example the supply transport means produces a supply flow of piece goods only to the lowermost of the conveyors arranged one above another, provision is preferably made that the sorting destinations statistically most frequently occurring correspond to the end locations arranged around the lowermost conveyor. This avoids unnecessary conveying of the piece goods into higher conveyors.

According to a further preferred development of the invention, provision is made that the conveyors are configured to carry out a continuous or a discontinuous movement in the conveying direction of the circuit. A continuous movement has the advantage that a high speed can be achieved, as a result of which a high sorting capacity is possible. Alternatively, it is possible for the conveyors to move discontinuously, comparably to the movement of a second hand of a clock. The sorting device therefore has high flexibility since it can be adapted to different requirements of the piece goods.

According to a further preferred development of the invention, provision is made that the sorting device is configured to be mobile. The sorting device is therefore preferably not bound to a fixed location, but rather can be used, for example by means of castors, at different locations. This permits high flexibility.

The sorting device is furthermore preferably designed for a loose supply of the piece goods. The piece goods are therefore preferably transported loosely, rather than in additional vessels, to the conveyors, the supply transport means and/or the active or passive transport means.

The object is also achieved by use of the above sorting device for sorting piece goods in end locations. Provision is preferably made here that the conveyors cause a continuous or discontinuous movement of the piece goods in the conveying direction of the circuit and/or that the piece goods are supplied loosely to the conveyors by means of a supply transport means.

One aspect therefore consists in that the conveyors and particularly preferably the circular conveyors can cause a continuous or discontinuous movement of the piece goods in the conveying direction, i.e. preferably in the tangential direction. A flow of piece goods is thus provided for the sorting, which is much more efficient than manual sorting or sorting by means of a robot arm. Preferably, in other words, the circular conveyors can convey the piece goods with a continuous movement in a circle or alternatively with a discontinuous movement, comparably to the movement of a second hand of a clock.

In addition, provision is preferably made that the piece goods are supplied loosely to the conveyors by means of the supply transport means. Particularly preferably, the piece goods are supplied exclusively loosely. This makes it possible to save costs since additional vessels do not have to be used.

Further features and advantages of the use are derived by a person skilled in the art from the description of the sorting device.

BRIEF DESCRIPTION OF THE DRAWINGS

The invention is explained in more detail below using preferred exemplary embodiments with reference to the attached drawings.

In the drawings

DETAILED DESCRIPTION OF THE EXEMPLARY EMBODIMENTS

Figure 1:
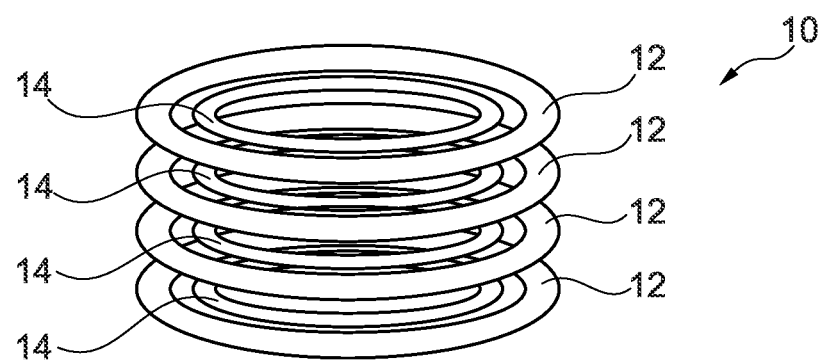
FIG. 1 shows a schematic view of a sorting device for sorting piece goods in end locations, according to a preferred exemplary embodiment of the invention.

FIG. 1 shows a schematic view of a sorting device 10 for sorting piece goods in end locations 12. The sorting device 10 comprises a plurality of horizontal conveyors 14, which are arranged one above another, for conveying the piece goods in a circuit, and the plurality of end locations 12, the end locations 12 being arranged along the conveyors 14. In the present exemplary embodiment, the sorting device 10 comprises four circular conveyors 14 arranged one above another, the circular conveyors 14 being arranged congruently one above another. The end locations 12 are located along an outer edge or the circular circuit of the circular conveyors 14 and are arranged in the manner of hollow cylinders around the circular conveyors 14.

Figure 2:
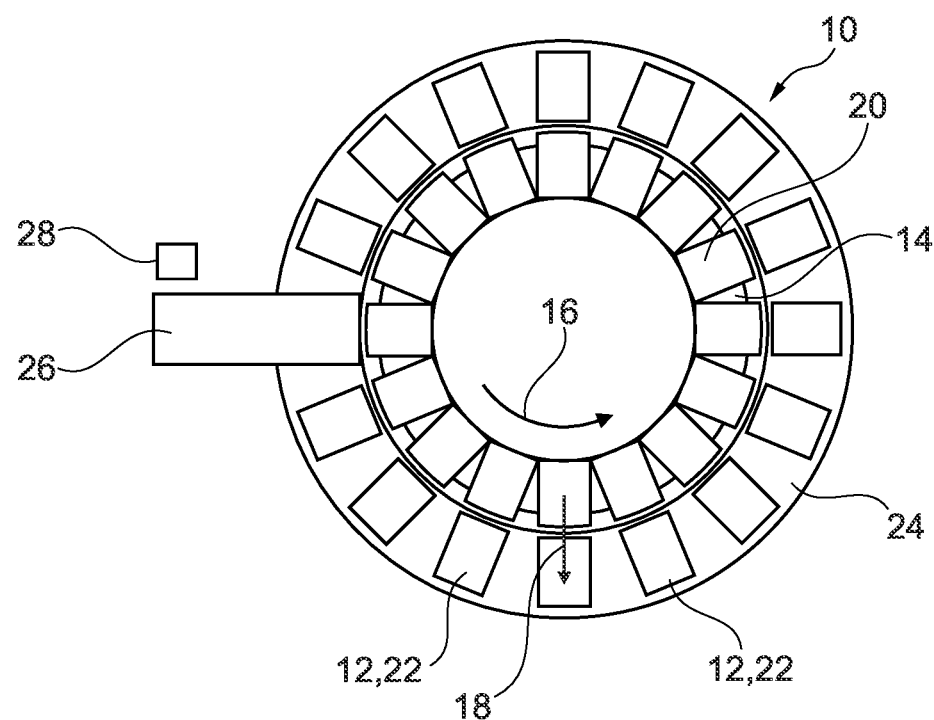
FIG. 2 shows a detailed illustration of a plane of the sorting device from FIG. 1 from above, and FIGS. 3 to 5 each show a schematic view of a sorting device, according to further preferred exemplary embodiments of the invention.

With regard to FIG. 2 which shows a detailed view of a plane of the sorting device 10 from FIG. 1, it can be seen that the circular conveyors 14 are configured to convey the piece goods along the circuit in a conveying direction 16 and to move the piece goods perpendicularly to the conveying direction of the circuit 16, i.e. in the radial direction 18. The circular conveyor 14 is configured here as a cross belt sorter 14 and has cross belts as discharging units 20 for discharging the piece goods into the end location 12. The end locations 12 are arranged regularly around the circular conveyor 14 and have containers 22 which are hung in a shelf 24 around the circular conveyors 14.

In addition, the sorting device 10 has a supply transport means 26 for producing a supply flow of piece goods to the circular conveyor 14. This is a conveyor line 26 in the present case. In addition, a scanner 28 connected in terms of communication to a computing unit (not shown) is arranged on the supply transport means 26 in order to detect sorting information relating to the piece goods.

Figure 3:
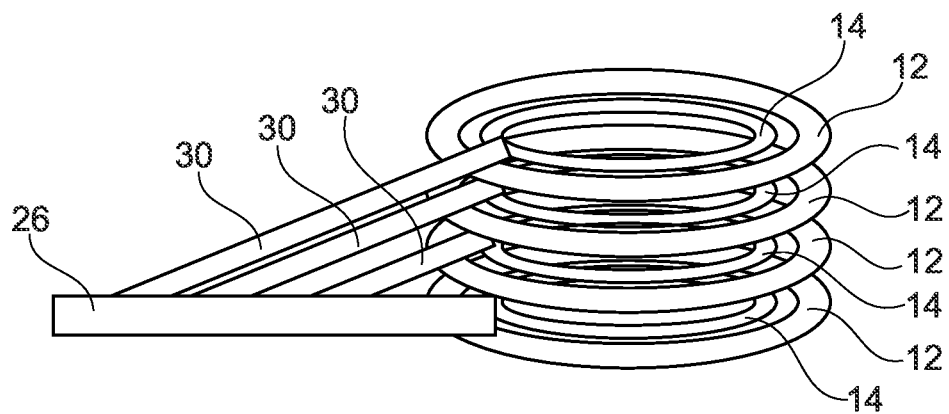
Figure 4:
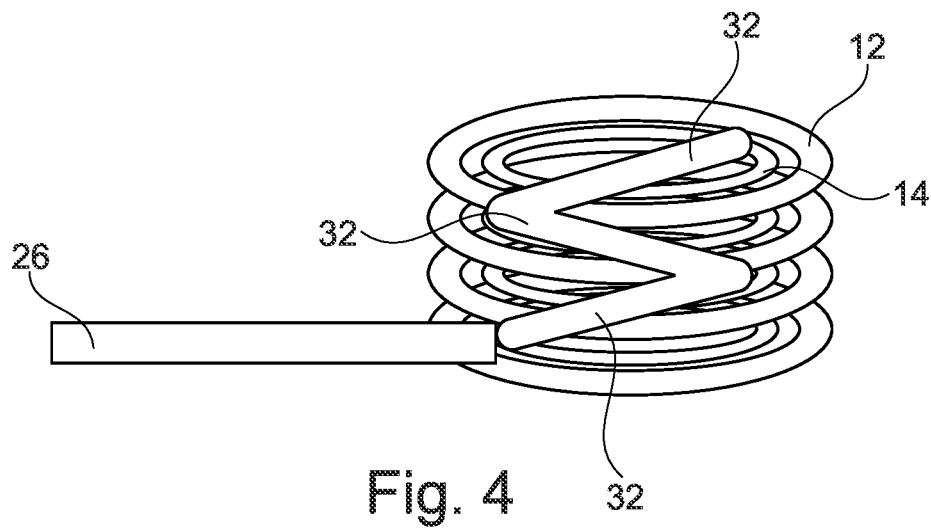
Figure 5:
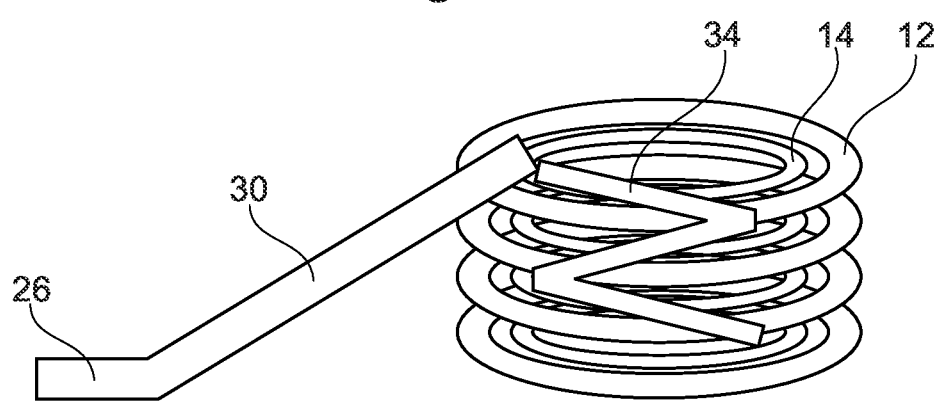

FIGS. 3 to 5 show schematic views of sorting devices 10, according to further preferred exemplary embodiments of the invention. In all three exemplary embodiments, the sorting devices 10, analogously to the exemplary embodiment in FIG. 1, have four circular conveyors 14 arranged one above another and the plurality of end locations 12, the end locations 12 being arranged in the manner of hollow cylinders around the circular conveyors 14.

In the exemplary embodiment shown in FIG. 3, the supply transport means 26 is configured for producing an individual supply flow of piece goods for each circular conveyor 14. For this purpose, the supply transport means 26 is split up next to the circular conveyors 14 arranged one above another, and therefore each circular conveyor 14 is provided with a dedicated branch of the supply transport means 26. It can also be seen in FIG. 3 that the supply transport means 26 comprises ascending belt conveyors 30 for overcoming the height difference in order thus to serve the higher circular conveyors 14. As an alternative to the ascending belt conveyors 30, spiral conveyors, not shown in FIG. 3, would also be suitable.

In the exemplary embodiment shown in FIG. 4, the supply transport means 26 is configured for producing a supply flow of piece goods to precisely one, specifically to the lowermost circular conveyor 14. Furthermore, in the interior of the circular conveyors 14, the sorting device 10 has an active transport means 32 for producing a flow of piece goods between the plurality of circular conveyors 14 arranged one above another. Here, in the exemplary embodiment shown in FIG. 4, the active transport means 32 is configured as an ascending belt conveyor 32. Three ascending belt conveyors 32 are used in order to connect the circular conveyors 14 which are directly adjacent to one another. The ascending belt conveyors 32 extend transversely through the space enclosed by the circular conveyors 14 and connect one point in one circular conveyor 14 to an opposite point in an adjacent circular conveyor 14. As an alternative to the ascending belt conveyors 32, a spiral conveyor, not shown in FIG. 4, could also be used in the interior of the circular conveyors 14.

In the exemplary embodiment shown in FIG. 5, the supply transport means 26 is configured analogously to FIG. 4 for producing a supply flow of piece goods to precisely one circular conveyor 14, but here to the uppermost of the circular conveyors 14. For this purpose, the supply transport means 26 comprises an ascending belt conveyor 30. In addition, the sorting device 10 in the interior of the circular conveyors 14 has a passive transport means 34 for producing a flow of piece goods between the plurality of circular conveyors 14 arranged one above another. The passive transport means 34 is configured here as a slide 34. Three slides 34 are used in order to connect the circular conveyors 14 which are directly adjacent to one another. Analogously to the ascending belt conveyors 32 in FIG. 4, the slides 34 extend transversely through the space enclosed by the circular conveyors 14 and connect one point in one circular conveyor 14 to an opposite point in an adjacent circular conveyor 14.

The exemplary embodiments described are merely examples which can be modified and/or supplemented in diverse ways within the scope of the claims. Each feature which has been described for a certain exemplary embodiment can be used independently or in combination with other features in any other exemplary embodiment. Each feature which has been described for an exemplary embodiment of a certain category can also be used in a corresponding manner in an exemplary embodiment of another category.

LIST OF REFERENCE SIGNS

10 Sorting device
12 End location
14 Conveyor, circular conveyor, cross belt sorter
16 Conveying direction
18 Direction perpendicularly to the conveying direction, radial direction
20 Discharging unit
22 Container
24 Shelf
26 Supply transport means, conveyor line
28 Scanner
30 Ascending belt conveyor
32 Active transport means, ascending belt conveyor
34 Passive transport means, slide

The invention claimed is:
1. A sorting device for sorting piece goods in end locations, comprising
a plurality of individual horizontal conveyors, wherein
each of the individual horizontal conveyors is configured as a conveyor belt, further configured for conveying the piece goods in a closed circuit, and further configured to move the piece goods perpendicularly to the conveying direction of the circuit, wherein the individual horizontal conveyors are arranged congruently one above another, a plurality of end locations, wherein the end locations are arranged along the conveyors in such a manner that the piece goods can be transported into the end locations by the movement perpendicularly to the conveying direction, and an active transporter or a passive transporter for producing a flow of the piece goods between the individual horizontal conveyors, wherein the active transporter or the passive transporter is arranged in a region surrounded by the closed circuits of the individual conveyors; and wherein the piece goods are transported from the individual conveyors into the end location only by the conveyor.

2. The sorting device according to claim 1, wherein the circuit is configured as a circle.

3. The sorting device according to claim 1, comprising a supply transporter for producing a supply flow of piece goods to at least one conveyor.

4. The sorting device according to claim 3, wherein the supply transporter is configured for producing an individual supply flow of piece goods for each conveyor, or wherein the supply transporter is configured for producing a supply flow of piece goods to precisely one and preferably to a lowermost or to an uppermost conveyor.

5. The sorting device according to claim 3, wherein the supply transporter comprises one or more of a belt conveyor, spiral conveyor, ascending belt conveyor and elevating conveyor.

6. The sorting device according to claim 3, comprising one or more of a scanner arranged on the supply transporter for detecting sorting information relating to the piece goods, and a computing unit for controlling the flow of piece goods in the sorting device taking into consideration the sorting information relating to the respective piece goods.

7. The sorting device according to claim 1, wherein the passive transporter comprises a slide.

8. The sorting device according to claim 1, wherein the active transporter comprises a conveyor unit, the conveyor unit including one or more of a spiral conveyor, an ascending belt conveyor and an elevating conveyor.

9. The sorting device according to claim 1, wherein the end locations are arranged according to one or more of a) along an outer edge of the circuit of the conveyors, and b) in the manner of hollow cylinders around the conveyors.

10. The sorting device according to claim 1, wherein the end locations comprise containers, and/or wherein one or more of the sorting device and the end locations are configured for automatically exchanging and/or moving up containers at the end locations.

11. The sorting device according to claim 1, wherein one or more of the sorting device and the end locations are configured for measuring filling levels at the end locations.

12. The sorting device according claim 1, wherein the conveyors are configured to carry out a continuous or a discontinuous movement in the conveying direction of the circuit.

13. The sorting device according to claim 1, wherein the active transporter and the passive transporter include at least one conveyor extending between adjacent conveyors of the plurality of horizontal conveyors.

* * * * *